United States Patent
Gochi Garcia

(10) Patent No.: US 10,959,285 B2
(45) Date of Patent: Mar. 23, 2021

(54) GATEWAY FOR EFFICIENT MANAGEMENT OF TRANSPORT CONNECTIONS IN DATA NETWORKS

(71) Applicant: Telefonaktiebolaget LM Ericsson (publ), Stockholm (SE)

(72) Inventor: Ibon Gochi Garcia, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/338,800

(22) PCT Filed: Oct. 6, 2016

(86) PCT No.: PCT/EP2016/073863
§ 371 (c)(1),
(2) Date: Apr. 2, 2019

(87) PCT Pub. No.: WO2018/065054
PCT Pub. Date: Apr. 12, 2018

(65) Prior Publication Data
US 2019/0254111 A1 Aug. 15, 2019

(51) Int. Cl.
*H04W 72/04* (2009.01)
*H04W 76/32* (2018.01)
(Continued)

(52) U.S. Cl.
CPC ......... *H04W 76/32* (2018.02); *H04L 67/2814* (2013.01); *H04L 67/327* (2013.01); *H04L 69/00* (2013.01); *H04W 88/16* (2013.01)

(58) Field of Classification Search
CPC .... H04W 76/32; H04W 88/16; H04L 67/327; H04L 67/2814; H04L 69/00
See application file for complete search history.

(56) References Cited

U.S. PATENT DOCUMENTS

2012/0257505 A1 10/2012 Kutscher et al.
2014/0226561 A1 8/2014 Kim et al.
(Continued)

OTHER PUBLICATIONS

Sandvine, "Global Internet Phenomena Report: Latest Internet and Subscriber Trends at Your Fingertips", pp. 1-6, retrieved on Feb. 9, 2016, retrieved from Internet https://www.sandvine.com/trends/global-internet-phenomena.
(Continued)

*Primary Examiner* — Hassan Kizou
*Assistant Examiner* — Mahbubul Bar Chowdhury
(74) *Attorney, Agent, or Firm* — Patent Portfolio Builders, PLLC

(57) ABSTRACT

A method, performed by a gateway node (110), for managing packets on a transport connection between a first end-point (120) and a second end-point (130) is disclosed. The gateway node (110) forwards (A020), on the transport connection (105), a first packet from the first end-point (120) to the second end-point (130). The gateway node (110) finds (A040), by inspection of the first packet, that the first packet indicates closing of the transport connection (105) at the first end-point (120). Moreover, the gateway node (110) receives (A120) after the finding (A040), on the transport connection, a second packet from the second end-point (130), wherein the second packet is destined to the first end-point (120). Furthermore, the gateway node (110) discards (A130) the second packet, thereby refraining from forwarding, on the transport connection, the second packet from the second end-point (130) to the first end-point (120). A gateway node (110), a computer program and a computer program carrier are also disclosed.

15 Claims, 5 Drawing Sheets

(51) Int. Cl.
*H04L 29/06* (2006.01)
*H04L 29/08* (2006.01)
*H04W 88/16* (2009.01)

(56) References Cited

U.S. PATENT DOCUMENTS

| | | | |
|---|---|---|---|
| 2015/0016261 A1 | 1/2015 | Backholm et al. | |
| 2015/0023160 A1* | 1/2015 | Alisawi | H04L 67/28 370/230 |
| 2016/0080529 A1* | 3/2016 | Lin | H04L 69/14 709/203 |
| 2018/0316617 A1* | 11/2018 | Lubenski | H04W 40/248 |

OTHER PUBLICATIONS

Office Action issued in corresponding EP Application No. 16778790.2 dated Mar. 6, 2020, 08 Pages. The references cited therein have previously been made of record.

* cited by examiner

GATEWAY FOR EFFICIENT MANAGEMENT OF TRANSPORT CONNECTIONS IN DATA NETWORKS

TECHNICAL FIELD

Embodiments herein relate to data networks, such as transport networks of e.g. a telecommunication system. In particular, a method and a gateway node for managing packets on a transport connection between a first end-point and a second end-point are disclosed. A corresponding computer program and a computer program carrier are also disclosed.

BACKGROUND

In telecommunication systems, data transmission has increased significantly in the last few years due to increased usage of smartphones and increased number of subscribers having either unlimited data plans or data plans with a significant quota. While data transmission has increased drastically, the telecommunication system may attempt to make the data transmissions more efficient, i.e. reduce required bandwidth for the data transmission, in order to save resources and possibly avoid congestion of different kinds.

Therefore, several approaches for making the data transmissions more efficient have been developed. These approaches include state of the art optimizations to save bandwidth, such as transparent and non-transparent caching, video transrating, transcoding, image compression and Transport Connection Protocol (TCP) improvements and the like.

A known telecommunication system typically includes a Radio Access Network (RAN) and a Core Network (CN). As an example, the CN may be a packet core network for a Third Generation Partnership Project (3GPP) Radio Access Network (RAN). The telecommunication system comprises a TCP network for establishing end-to-end connections between e.g. a user equipment and a content provider, i.e. a server that provides e.g. a video stream that is displayed by the user equipment to a user thereof. In order to reduce a required bandwidth for transmitting the video stream to the user equipment, an intermediate node, on the transport network between the user equipment and the content provider, may transrate the video stream. Transrate typically refers to that a format of the video stream remains unaltered, but e.g. resolution may be reduced or compression ratio may be increased. A disadvantage is that the intermediate node cannot perform such transrating when communication between the user equipment and the content provider is end-to-end encrypted. The aforementioned disadvantage also applies for other approaches, such as the caching mentioned above. Moreover, a further disadvantage is that the intermediate node is required to be aware of the video coding format used for encoding of the video stream.

SUMMARY

An object may be to improve performance of the above mentioned transport network in a manner that is applicable to both encrypted and unencrypted traffic.

According to an aspect, the object is achieved by a method, performed by a gateway node, for managing packets on a transport connection between a first end-point and a second end-point. The gateway node is located on the transport connection. The gateway node forwards, on the transport connection, a first packet from the first end-point to the second end-point. The gateway node finds, by inspection of the first packet, that the first packet indicates closing of the transport connection at the first end-point. After the first packet is found, the gateway node receives, on the transport connection, a second packet from the second end-point. The second packet is destined to the first end-point. The gateway node discards the second packet, thereby refraining from forwarding, on the transport connection, the second packet from the second end-point to the first end-point.

According to another aspect, the object is achieved by a gateway node configured for managing packets on a transport connection between a first end-point and a second end-point. The gateway node is located on the transport connection. The gateway node is configured for forwarding, on the transport connection, a first packet from the first end-point to the second end-point. The gateway node is further configured for finding, by inspection of the first packet, that the first packet indicates closing of the transport connection at the first end-point. The gateway node is configured for receiving, on the transport connection, a second packet from the second end-point, after the finding. The second packet is destined to the first end-point. Furthermore, the gateway node is configured for discarding the second packet, thereby refraining from forwarding, on the transport connection, the second packet from the second end-point to the first end-point.

According to further aspects, the object is achieved by a computer program and a computer program carrier corresponding to the aspects above.

The gateway node inspects, e.g. by reading a header of the first packet, the first packet in order to find any packet that indicates closing of the transport connection. The header may comprise a TCP header or the like. Thanks to that the gateway node may inspect the header, the gateway node is made aware of that the transport connections is to be closed at the first end-point. Therefore, when the gateway node subsequently receives the second packet, which is destined to the first end-point who is closing down—or has closed down—the transport connection, the gateway node discards the second packet. This is advantageous, since the second packet would have been discarded, or dropped, by the first end-point, if the gateway node would have forwarded the second packet to the first end-point instead of—as mentioned—having discarded the second packet. Thus, the second packet is not unnecessarily sent, by the gateway node, towards the first end-point. Accordingly, transmission on the transport connection, in particular in e.g. a closing phase of the transport connection, is performed more efficiently.

An advantage is thus, now expressed somewhat differently, that the gateway node relieves the transport connection from packets that would be dropped at the first end-point anyway.

Moreover, since the gateway node inspects the header of the first packet on the transport connection, the embodiments herein may be applied to unencrypted packets as well as to end-to-end-encrypted packets.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
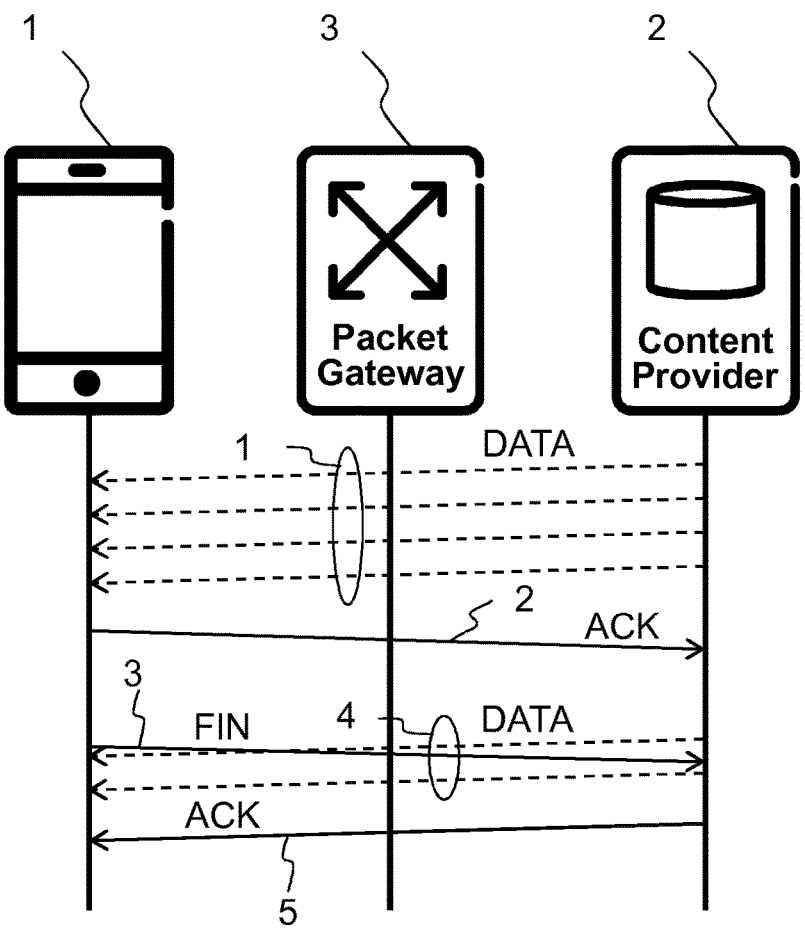
FIG. 1 is a schematic signaling diagram illustrating exchange of packets on a transport connection according to prior art.

Throughout the following description similar reference numerals have been used to denote similar features, such as nodes, actions, steps, modules, circuits, parts, items elements, units or the like, when applicable.

In order to better appreciate the embodiments herein, a known system and a related signaling diagram is described with reference to FIG. 1. The system comprises a user equipment 1, a content provider 2 and an intermediate node 3. A TCP connection has been established (not shown) between the user equipment 1 and the content provider 2. Initially, in action 1, the content provider 2 sends data, such as segments of data, towards the user equipment 1 via the intermediate node 3. The user equipment 1 acknowledges reception of the data in action 2. Then, in action 3, the user equipment 1 sends a FIN towards the content provider 2, e.g. because a user of the user equipment closes down an application, in the user equipment 1, that received the data sent in action 1. The FIN indicates that the user equipment 1 closes the TCP connection. However, the content provider 2 is not yet aware of that the user equipment 1 has sent the FIN in action 3, therefore the content provider 2 sends additional data, in action 4, towards the user equipment 1. A disadvantage is that the additional data sent in action 4 will, most likely, be dropped by the user equipment 1. Thus, the additional data puts unnecessary load on the TCP connection between the user equipment 1 and the content provider 2. A problem is hence how to reduce the unnecessary load, in particular at closing of the TCP connection. Upon receiving the FIN at the content provider 2, the content provider 2 will eventually close down the TCP connection and cease with sending of data. Moreover, the content provider 2 sends an acknowledgement towards the user equipment 1 in order to confirm receipt of the FIN.

It shall here be said that TCP is a connection oriented, symmetric protocol. Transmissions can be unidirectional or bidirectional, with each end-point capable of transmitting, receiving and closing its own direction, e.g. its own half of the connection. When an end-point closes its end of the connection it is assumed that it will not transmit any more data and while it could still receive data, e.g. if half-closed connections are supported, but in most cases it generally means that the end-point is not willing to receive any more data either. The embodiments herein make use of this knowledge to stop transmitting any more data for the connection after one of the end-points closes the connection. In this manner, bandwidth and resources may be saved.

Figure 2:
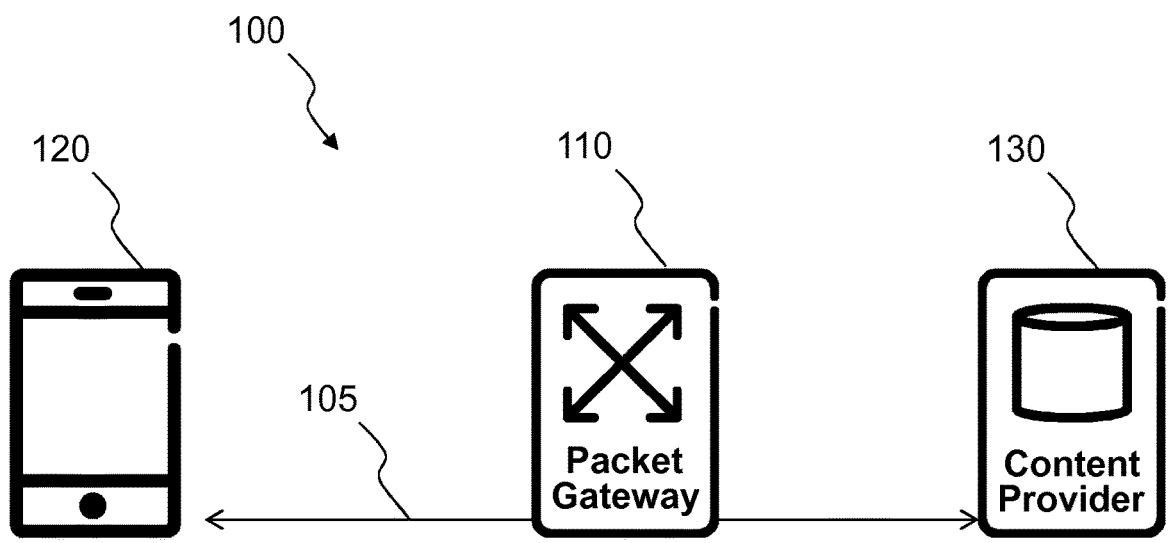
FIG. 2 is a schematic overview of an exemplifying network in which embodiments herein may be implemented.

FIG. 2 depicts an exemplifying transport network 100 in which embodiments herein may be implemented. In this example, the transport network 100 is a TCP network. In other examples, the transport network 100 may be a Stream Control Transmission Protocol (SCTP) network or the like. This means that the transport network 100 may be based on TCP, SCTP or any other known connection oriented transport protocol.

The transport network 100 comprises a gateway node 110, such as a Packet Gateway of an Evolved Packet Core network of a 3GPP telecommunication network, comprising the transport network 100.

Furthermore, the transport network 100 may be said to comprise a first end-point 120, here exemplified by a wireless communication device.

Moreover, the transport network 100 may be said to comprise a second end-point 130, here exemplified by a server providing content, such as any requested data, a video stream, an audio stream or the like, to the first end-point 120.

Summarized, the transport network 100 may comprise the gateway node 110, the first end-point 120 and the second end-point 130.

A transport connection 105 is established between the first end-point 120 and the second end-point 130. The transport connection 105 may be a transport layer connection, a TCP connection, a SCTP connection or the like. The gateway node 110 is located on the transport connection 105.

On the transport connection 105 packets, or frames, may be exchanged, e.g. sent from/to and/or received from/by, between the first and second end-points 120, 130. The term "packet" may refer to a TCP packet, SCTP packet or the like.

As used herein, the term "wireless communication device" may refer to a user equipment, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. Sometimes, the term "user" may be used to refer to the user equipment or the like as above. It shall be understood that the user may not necessarily involve a human user. The term "user" may also refer to a machine, a software component or the like using certain functions, methods and similar.

As used herein, the term "server providing content" may refer to a content provider, a server machine hosting a service, a PC running a service or the like.

Figure 3:
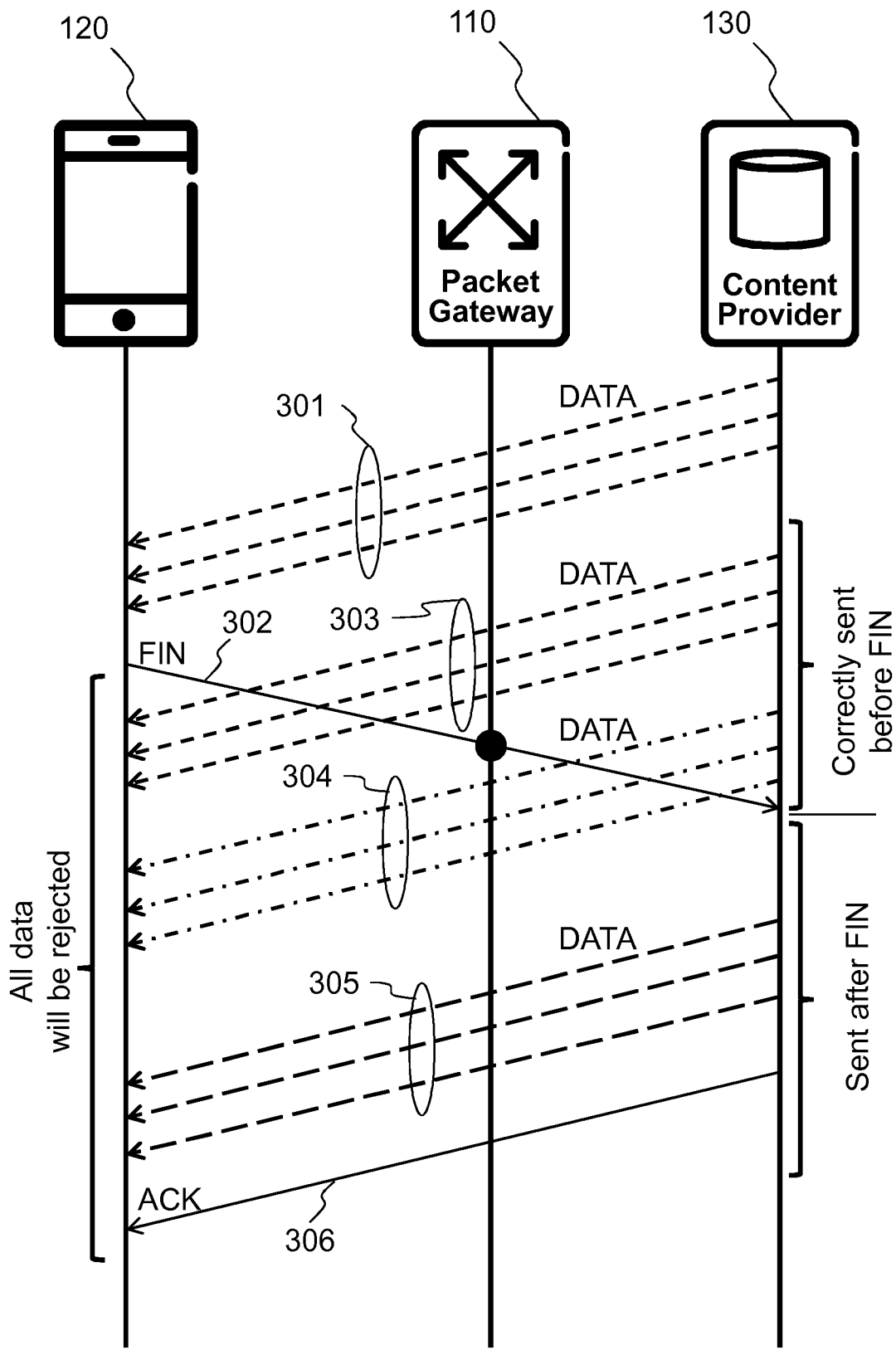
FIG. 3 is a schematic signaling diagram illustrating in more detail exchange of packets on a transport connection according to prior art.

FIG. 3 illustrates in more detail exchange of packets on the transport connection 105 according to FIG. 2. The packets are exchanged, e.g. sent and received, between the first end-point 120 and the second end-point 130.

Action 301

Initially, the second end-point 130 sends a stream of data to the first end-point 120. The stream of data may comprise packets, such as TCP packet, SCTP packets or the like.

Action 302

For any reason, the first end-point 120 may have decided to close down the transport connection 105. Such any reason may be that a user of the first end-point 120 may have closed down a music app for listening to music. Thus, the first end-point 120 shall preferably no longer receive an audio stream for playback of the music towards the user. As a further example of such any reason, the first end-point 120 may close down the transport connection, because an app has finished uploading of a file to an instant messaging service or because a user has stopped watching a streaming video, or the like.

Accordingly, the first end-point 120 sends a FIN packet, or a FIN frame, towards the second end-point 130. The FIN packet is an example of the first packet in case the transport network is a TCP transport network. In more detail, typically in case of TCP, FIN is a flag of the TCP header. When the FIN flag is set, e.g. equal to one, the entire packet or frame, comprising the FIN flag, is referred to as "closing packet" or "FIN packet" herein.

Action 303 and 304

However, before the FIN packet has been received by the second end-point 130, the second end-point 130 is not aware of that the first end-point 120 no longer wishes to receive data, such as the aforementioned audio stream or the like.

Therefore, the second end-point 130 sends, in action 303, a first set of data towards the first end-point 120. Additionally, the second end-point 130 sends, in action 304, a second set of data towards the first end-point 120.

Notably, the FIN packet has reached the gateway node 110 when the gateway node 110 forwards the second set of data in action 304. This means that the gateway node 110 is not yet aware of that the first end-point 120 has sent the FIN packet when the gateway node 110 forwards the first set of data in action 303.

Action 305

At this stage, the FIN packet, sent by the first end-point 120 in action 302, has reached the second end-point 130. However, for various reasons, such as delay of processing of the FIN packet, flushing of a so called send-buffer, the second end-point 130 may send a third set of data towards the first end-point 120. Exact behavior of the second end-point 130 in this action is dependent upon implementation of transport layer protocol. This means e.g. that a standard specification of the transport layer protocol may allow for some flexibility in terms of how the FIN packet is required to be treated by the second end-point 130 in this example.

Action 306

Regardless the exact behavior of the second end-point 130 in action 305, the second end-point 130 sends an acknowledgement packet ACK, or ACK frame, towards the first end-point 120.

Should the first end-point 120 not receive the acknowledgement packet ACK within a certain time period, but still within an ACK timeout period, it may be that the first end-point 120 will resend the FIN packet towards the second end-point 130.

Figure 4:
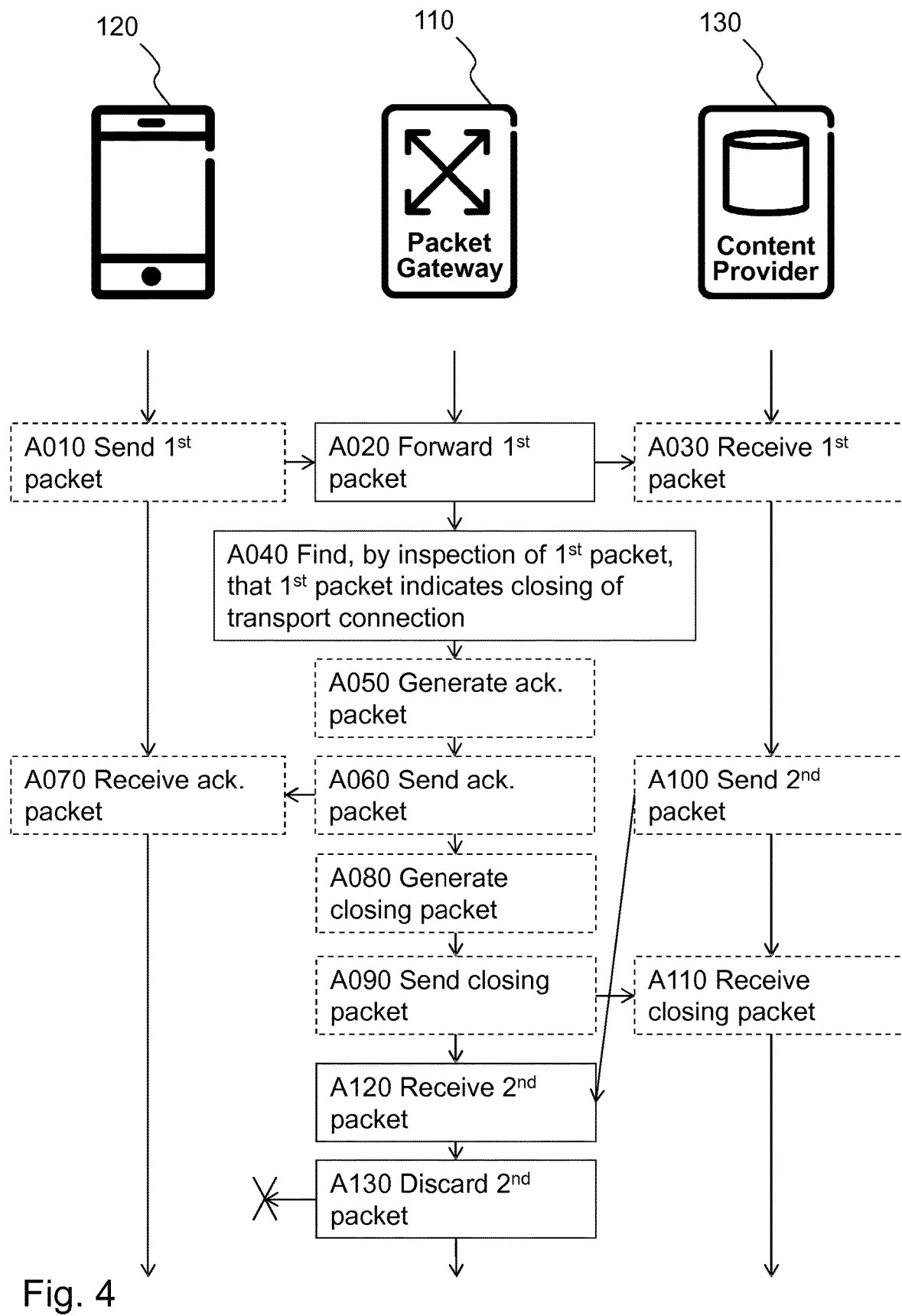
FIG. 4 is a combined signaling and flowchart illustrating the methods herein.

In view of the above, FIG. 4 illustrates an exemplifying method according to embodiments herein when implemented in the transport network 100 of FIG. 1. The embodiments have at least an advantage of reducing unnecessarily sent packets toward the first end-point 120 when the gateway node 110 is aware of that the first end-point 120 is about close down the transport connection. In FIG. 4, features that appear in some embodiments are indicated by dashed lines.

The gateway node 110 performs a method for managing packets on a transport connection 105 between the first end-point 120 and the second end-point 130.

As mentioned, the gateway node 110 is located on the transport connection 105.

One or more of the following actions may be performed in any suitable order.

Action A010

Similarly to action 302 above, the first end-point 120 may send a first packet towards the second end-point 130. The first packet may be a FIN packet, or a FIN frame in case of TCP. In case of SCTP, the first packet may be a so called SHUTDOWN, e.g. a SHUTDOWN flag, a SHUTDOWN frame, a SHUTDOWN packet or the like.

Action A020

Subsequent to action A010, the gateway node 110 forwards, on the transport connection 105, the first packet from the first end-point 120 to the second end-point 130. This means that the gateway node 110 receive the first packet from the first end-point 120 and then sends the first packet to the second end-point 130.

Action A030

Subsequent to action A020, the second end-point 130 receives the first packet from the gateway node 110.

Action A040

In addition to that the gateway node 110 forwards the first packet in action A020, the gateway node 110 finds, by inspection of the first packet, that the first packet indicates closing of the transport connection 105 at the first end-point 120. This means that the gateway node 110 is aware of 1) that the first end-point 120 is about to close down the transport connection 105 and 2) that the first end-point 120 will, most likely, discard any further received data packet on the transport connection 105. Any further received data packet may in particular refer to e.g. user data packets including payload or the like. These user data packets are thus distinguished from control packets, indicating e.g. acknowledgement, closing, reset, etc.

The gateway node 110 may inspect the first packet by decoding a so called transport layer header of the first packet, such as a TCP-header, SCTP-header or the like. In many cases, Shallow Packet Inspection (SPI) may be applied, while it may sometimes be necessary to apply Deep Packet Inspection (DPI) in other cases.

Mirroring or taping according to known procedures may be performed by the gateway node 110 in order to inspect the first packet.

This action may be performed as soon as the gateway node 110 has received the first packet as part of action A020. It is thus contemplated that sending of the first packet towards the second end-point 130 may be performed after, or before, this action.

It may here be noted that the terms "discard" and/or "drop" are considered to indicate that a packet is not processed. In contrast thereto, a rejection of a packet may imply that a response is send back to—in this example—the second end-point 130. Any such response would then indicate that the first end-point 120 did not process the packet. With the embodiments herein, such responses indicating a rejection should preferably not be transmitted.

Action A050

After the finding A040, the gateway node 110 may generate, in response to the received first packet, an acknowledgment packet to cause the first end-point 120 to close down the transport connection.

Action A060

Also after the finding A040, the gateway node 110 may send, on the transport connection, the acknowledgement packet towards the first end-point 120. In this manner, the first end-point 120 receives a fast acknowledgement of the first packet and need thus not to resend the third packet in case the first packet should get lost on its way to the second end-point 130. Notably, the acknowledgement packet sent in this action is thus not received from the second end-point 130 and forwarded accordingly as in prior art.

The acknowledgement packet is sent with the intention of instructing the first end-point 120 to close down the transport connection 105.

Embodiments, including action A050 and A060 above, are referred to as "first embodiments" herein.

Action A070

Subsequently to action A060, the first end-point 120 may receive the acknowledgment packet. Upon processing of the acknowledgment packet closing, or tear down, of the transport connection 105 is finalized. Thus, any resources, such as memory, processing power, i/o-ports or the like, that were become occupied due to establishment of the transport connection 105 are now released.

Now returning to the gateway node 110, embodiments, including action A080 and A090 below, are referred to as "second embodiments" herein. It may be preferred to combine the first embodiments with the second embodiments.

Action A080

Moreover, after the finding A040, the gateway node 110 may generate a closing packet to cause the second end-point 130 to close down the transport connection.

The closing packet may comprise a reset packet, "RST", or a finish packet, "FIN".

Action A090

Furthermore, after the finding A040, the gateway node 110 may send, on the transport connection, the closing packet towards the second end-point 130.

The closing packet is sent with the intention of instructing the second end-point 130 to close down the transport connection 105.

In particular, in case the first embodiments are combined with the second embodiments, the gateway node 110 may have taken over a responsibility for sending the first packet towards the second end-point 130. Thus, it may be that the gateway node 110 may resend the first packet as the closing packet, either directly as a precautionary measure in case the first packet is lost. Alternatively or additionally, the gateway node 110 may resend the first packet if no acknowledgment of the first packet is received within a particular time period, but still within a closing timeout period.

Before proceeding with the description of the actions performed by the gateway node 110, some actions of the second end-point 130 are described.

Action A100

This action is preferably performed before the closing packet sent in action A090 has reached the second end-point 130. However, this action may also be performed after the closing packet has reached the second end-point 130, but then the second end-point 130 may perform this action, due to e.g. flushing of a send buffer or the like. Hence, the second end-point 130 may send a second packet towards the gateway node 110, wherein the second packet is destined for the first end-point 120. See also action 303 and/or 304 above.

Action A110

Subsequent to action A090, the second end-point 130 receives the closing packet unless it is lost.

When the closing packet is a reset packet RST, the second end-point 130 may abruptly close and reset the transport connection.

When the closing packet is a finish packet FIN, the second end-point 130 may perform some tear-down procedure and ultimately close down the transport connection. Depending on implementation the second end-pint 130 may or may not flush a send buffer, which would cause packets to be sent towards the first end-point 120.

Expressed somewhat differently, in case of TCP, the closing packet may include a RST or a FIN flag that is set, e.g. equal to one. The RST and FIN flags will ultimately have the effect of closing down the connection, but the exact behaviour may depend on how TCP has been implemented in the second end-point 130.

Action A120

Subsequent to action A100, the gateway node 110 receives after the finding A040, on the transport connection 105, the second packet from the second end-point 130, wherein the second packet is destined to the first end-point 120.

With the embodiments herein, the second packet carries user data provided by the second end-point 130. The second packet may thus be destined to the first end-point 120. The user data, provided by the second end-point 130, may be payload data, video data, audio data or the like.

Action A130

The gateway node 110 discards the second packet, thereby refraining from forwarding, on the transport connection, the second packet from the second end-point 130 to the first end-point 120. In this manner, the gateway node 110 filers out data sent towards the first end-point 120 if the first end-point 120 has already sent a packet, or segment, with a FIN flag set, i.e. the first packet found in action A040. Thus, the second packet is dropped by the gateway node 110 in advance of potentially being dropped by the first end-point 120.

With the embodiments herein, it may be that the gateway node 110 may only discard the second packet, when the second packet comprises user data. This means that the gateway node 110 may not discard control packets, such as the acknowledgment packet, sent in action 306, unless actions of the first embodiments are performed or the second packet has been preceded by an acknowledgement packet from the second end-point 130 with respect to the first packet. It shall here be said that e.g. a TCP packet is strictly not a control packet or a data packet. Rather, as used herein the terms "control packet" and "data packet" refers to whether or not a segment, or packet, has any control flag set, such as FIN, ACK, RST, but not e.g. URG.

Accordingly, in particular with the first embodiments, the gateway node 110 may discard the second packet irrespective of whether the second packet comprises user data or control data.

Generally, when the first packet has been acknowledged towards the first end-point 120 either by forwarding of an acknowledgment packet preceding the second packet or by performing the action of the first embodiments, the gateway node 110 also discards the second packet when the second packet is a control packet.

At this stage, the method may be considered to be completed.

An increase of quickly opening and closing of connections, and sometimes closing even without waiting for a completion of the closing, is expected in view of e.g. a myriad of connected devices in conjunction with Internet-Of-Things. Therefore, the embodiments herein contribute to a substantial reduction of unnecessarily transmitted packets, i.e. packets that would be discarded by a receiver, such as the user equipment 120, even though the embodiments herein may be particularly applicable when a connection is closed down, or is to be closed down.

Moreover, considering that a Round-Trip-Time (RTT) in a modern network often is measured in tenths or even hundreds of milliseconds and that speed of the modern network may be measured in Megabits or Gigabits per second, it may safely be assumed that hundreds of thousands of bytes may be sent from the second end-point 130 towards the first end-point 120 after the first end-point 120 has decided to close the transport connection, e.g. by sending of the first packet found to indicated closing of the transport connection. These hundreds of thousands of bytes will be dropped by the first end-point 120, e.g. because the transport layer, such as TCP stack, on the first end-point 120 no longer has an application running that the data is to be delivered to. Therefore, according to the embodiments herein the gateway node 110 drops, or discards, these hundreds of thousands of bytes early, i.e. before reaching the first end-point 120. In this manner, as already mentioned before, resources for transmission on radio and/or backhaul may be saved.

Advantageously, the embodiments herein are implemented at transport layer. Accordingly, the embodiments herein do not impact any bandwidth saving procedures implemented at application layer. Examples of such bandwidth saving procedures include, e.g. transcoding, caching or the like as mentioned above. As a result, the embodiments herein may be applied in addition to any such bandwidth saving procedures, irrespectively of whether or not an end-to-end-connection at the application layer is encrypted or not encrypted.

It may here be noted that encryption in one of its most common form, such as encrypted HyperText Transfer Protocol (HTTP), often referred to as HTTPs, uses Secure Sockets Layer (SSL)/Transport Layer Security (TLS) which is a transport level encryption that is applied on top of TCP. Thus, SSL/TLS leaves TCP itself unmodified and unencrypted. Thanks to that the embodiments herein mainly operate at transport layer, such as TCP, the embodiments herein may also be applicable in case traffic is encrypted with HTTPs.

Furthermore, an advantage with the embodiments herein as compared to e.g. transrating may be that there is no impact on user experience in terms of that payload, user data or the like, reaching an end-point, such as the first or second end-points 120, 130, have not been tampered with, e.g. the payload's resolution has not been further decreased. This advantage applies in particular to when e.g. an application layer in the first and/or second end-points 120, 130 does not allow so called half-closed connections. While this is in fact a limitation of the applicability of the embodiments herein, it is considered that it is not a severe limitation due to that most applications nowadays do not implement half-closed connection. However, in order to mitigate the limitation, it may in some embodiments be that the gateway node 110 filters out packets to/from applications implementing half-closed connections by means of e.g. DPI.

It shall here also be noted that although FIG. 4 is described mainly with reference to that the first end-point 120, such as the user equipment, initiates the closing, the embodiments herein are equally applicable in case the second end-point 130, such as the content provider, initiates the closing of the transport connection. A reason for this is that e.g. TCP has symmetrical properties. Notably, in case the second end-point 130 initiates the closing of the transport connection, savings i.e. reduction of unnecessarily sent packets, will not be on radio access but on backhaul and over the Internet towards the second end-point 130.

Figure 5:
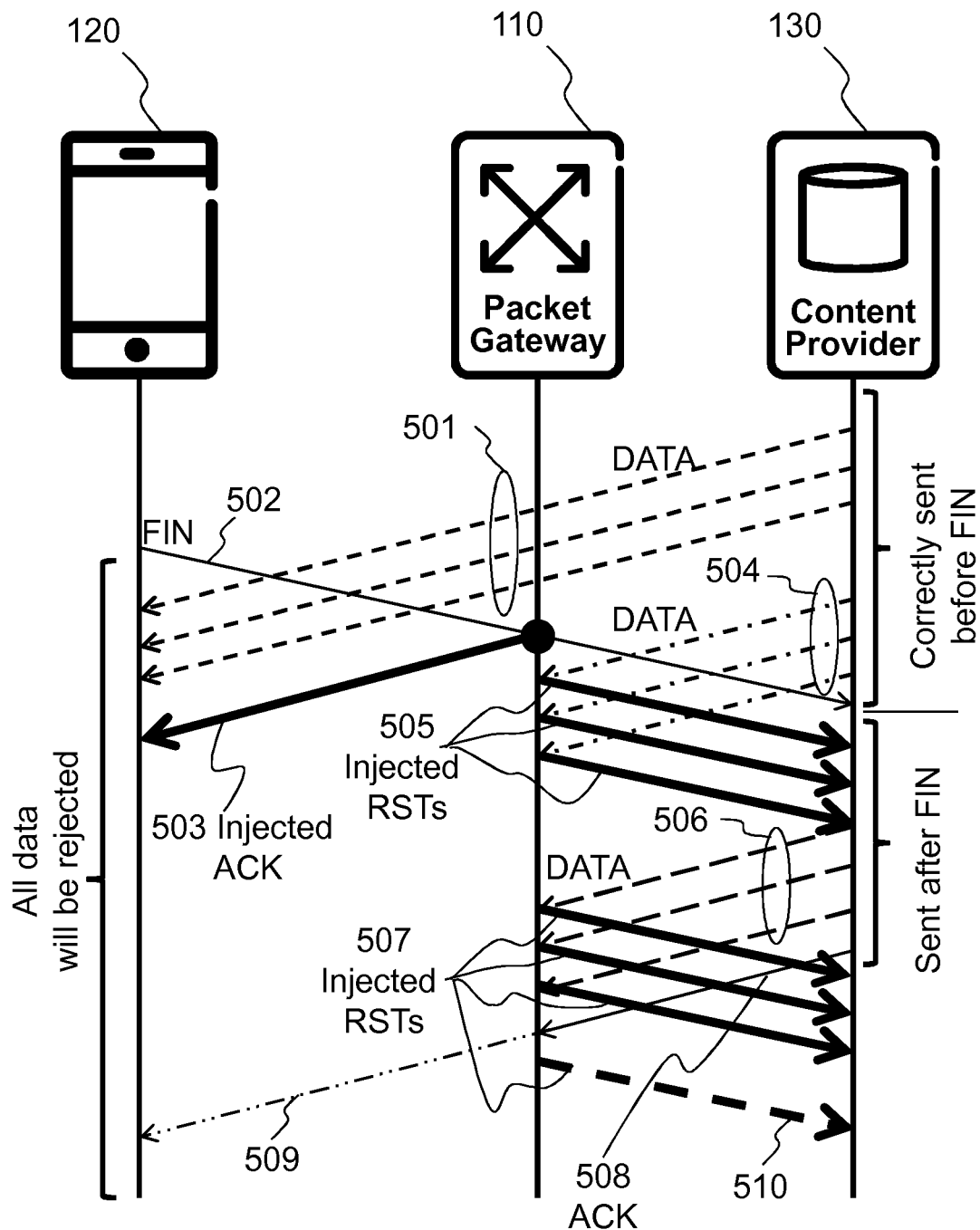
FIG. 5 is a schematic signaling diagram illustrating exchange of packets on a transport connection according to embodiments herein.

FIG. 5 illustrates exchange of packets on the transport connection 105 according to embodiments herein in order to highlight particular features and advantages.

Action 501

Initially, similarly to action 301, the second end-point 130 sends a stream of data to the first end-point 120. The stream of data may comprise packets, such as TCP packet, SCTP packets or the like.

Action 502

For any reason, the first end-point 120 may have decided to close down the transport connection 105.

Accordingly, the first end-point 120 sends a FIN packet, or a FIN frame, towards the second end-point 130. Again, the FIN packet is an example of the first packet in case the transport network is a TCP transport network.

This action is similar to action 302, A010, A020 and A030.

Action 503

According to the first embodiments, the gateway node 110 may generate and send an acknowledgement packet towards the first end-point 120. This action is similar to actions A050 and A060.

Action 504

Before the FIN has been received by the second end-point 130, the second end-point 130 may, of course while not knowing that a FIN is on its way to it, send further data. These data may include user data and/or control data. This action is similar to action 304 and/or A100.

Action 505

According to the second embodiments, the gateway node 110 may generate and send, i.e. inject, a closing packet, such as a RST packet or a FIN packet in case of TCP.

Since the gateway node 110 is aware of that the transport connection 105 is to be closed down, the gateway node 110 may as a precautionary measure inject the closing packet in response to reception of user data sent in action 504. This action is similar to action A080 and A090.

Although FIG. 5 illustrates a plurality of closing packets sent to the second end-point 130, it shall be noted that only one closing packet may be sent in action 505. Said only one closing packet may, for example, be sent upon reception of the first packet of the packets sent from the second end-point 130 in action 504. Thus, packets, being subsequent to this first packet in action 504 and also being received from the second end-point 130, may simply be ignored for without any processing.

Action 506

Even after the FIN has been received by the second end-point 130, the second end-point 130 may send yet further data. These data may include user data and/or control data. This action is similar to action 305 and/or A100. As mentioned, action A100 may be performed before or after action A110.

Action 507

Thus, also according to the second embodiments, the gateway node 110 may inject one or more closing packets, such as RST packets, towards the second end-point 130. This action is similar to action A080 and A090.

Action 508

Upon processing of the FIN packet, the second end-point 130 may send an acknowledgement packet towards the first end-point 120. This action is similar to action 306.

Action 509

As described above in relating to action A130, the gateway node 110 may primarily discard user data packets, unless the actions of the first embodiments have been performed or the gateway node 110 has already send an acknowledgement towards the first end-point 120 with respect to the first packet, aka the FIN packet.

Action 510

The gateway node 110 may apply the second embodiments as long as no acknowledgment has been sent towards the first end-point 120 with respect to the first packet. In this manner, it is avoided that the connection between the gateway node 110 and the second end-point 130 is unnecessarily loaded by closing packets.

Figure 6:
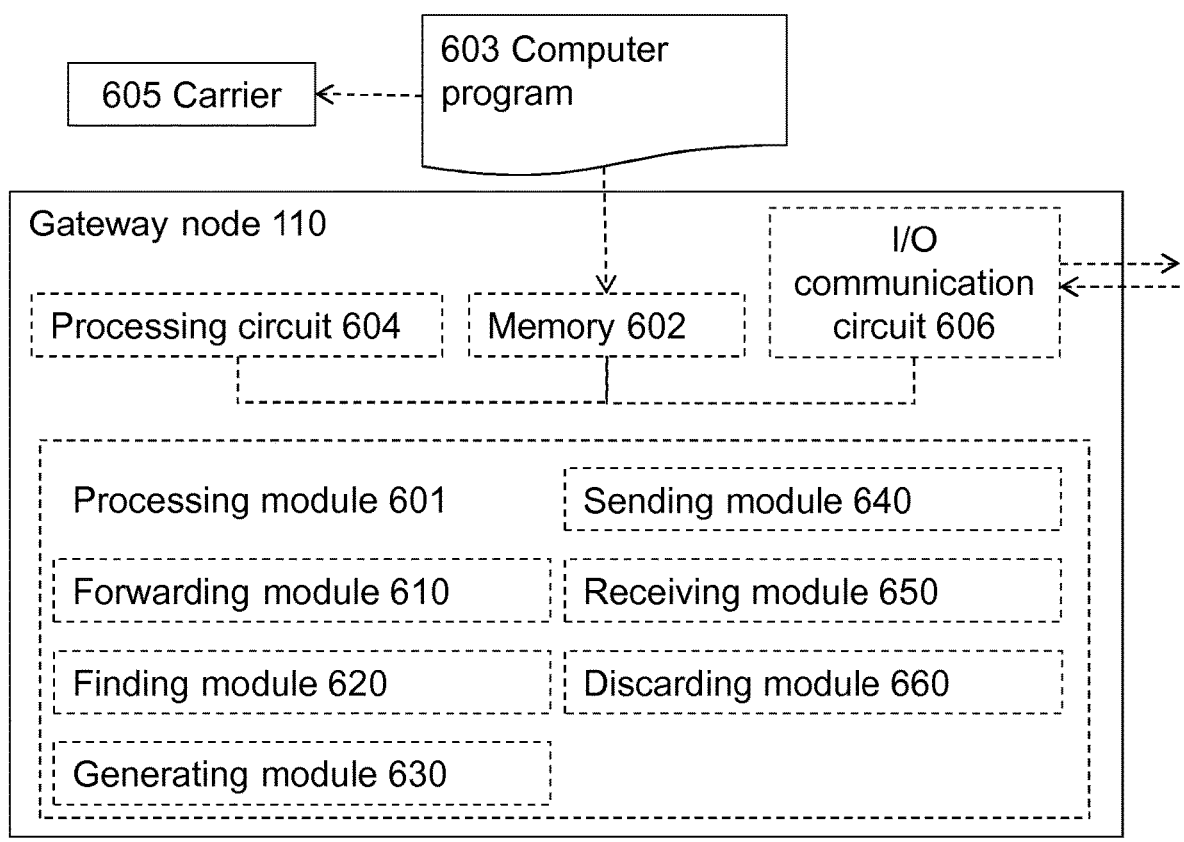
FIG. 6 is a block diagram illustrating embodiments of the gateway node.

With reference to FIG. 6, a schematic block diagram of embodiments of the gateway node 110 of FIG. 2 is shown. In FIG. 6, features that appear in some embodiments are indicated by dashed lines.

The gateway node 110 may comprise a processing module 601, such as a means for performing the methods described herein. The means may be embodied in the form of one or more hardware modules and/or one or more software modules The gateway node 110 may further comprise a memory 602. The memory may comprise, such as contain or store, instructions, e.g. in the form of a computer program 603, which may comprise computer readable code units.

According to some embodiments herein, the gateway node 110 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the gateway node 110 is operative to perform the methods of FIG. 4 and/or FIG. 5. As another example, the instructions, when executed by the gateway node 110 and/or the processing circuit 604, may cause the gateway node 110 to perform the method according to FIG. 4 and/or FIG. 5.

In view of the above, in one example, there is provided a gateway node 110 for managing packets on the transport connection between the first end-point 120 and the second end-point 130. As mentioned, the gateway node 110 is located on the transport connection 105. Again, the memory 602 contains the instructions executable by said processing circuit 604 whereby said gateway node 110 is operative for:

forwarding, on the transport connection 105, a first packet from the first end-point 120 to the second end-point 130, finding, by inspection of the first packet, that the first packet indicates closing of the transport connection 105 at the first end-point 120, receiving, on the transport connection, a second packet from the second end-point 130 after the finding, wherein the second packet is destined to the first end-point 120, and discarding the second packet, thereby refraining from forwarding, on the transport connection, the second packet from the second end-point 130 to the first end-point 120.

FIG. 6 further illustrates a carrier 605, or program carrier, which comprises the computer program 603 as described directly above.

In some embodiments, the processing module 601 comprises an Input/Output (I/O) communication circuit, 606 for accomplishing with reception and transmission of data packets. The communication circuit 606 may be exemplified by a receiving module 650 and/or a sending module 640 as described below.

In further embodiments, the gateway node 110 and/or the processing module 601 may comprise one or more of a forwarding module 610, a finding module 620, a generating module 630, the sending module 640, the receiving module 650, and a discarding module 660 as exemplifying hardware modules. In other examples, one or more of the aforementioned exemplifying hardware modules may be implemented as one or more software modules.

Accordingly, the gateway node 110 is configured for managing packets on the transport connection 105 between the first end-point 120 and the second end-point 130.

As mentioned, the gateway node 110 is located on the transport connection 105.

Therefore, according to the various embodiments described above, the gateway node 110 and/or the processing module 601 and/or the forwarding module 610 is configured for forwarding, on the transport connection 105, a first packet from the first end-point 120 to the second end-point 130. For example, in some embodiments, the forwarding module 610 may cooperate with the sending module 640, or be integrated as a part of said sending module.

The gateway node 110 and/or the processing module 601 and/or the finding module 620 is configured for finding, by inspection of the first packet, that the first packet indicates closing of the transport connection 105 at the first end-point 120.

Moreover, the gateway node 110 and/or the processing module 601 and/or the receiving module 650 is configured for receiving, on the transport connection, a second packet from the second end-point 130 after the finding, wherein the second packet is destined to the first end-point 120.

Furthermore, the gateway node 110 and/or the processing module 601 and/or the discarding module 660 is configured for discarding the second packet, thereby refraining from forwarding, on the transport connection, the second packet from the second end-point 130 to the first end-point 120.

According to the first embodiments, the gateway node 110 and/or the processing module 601 and/or the generating module 630 may be configured for generating, in response to the received first packet, an acknowledgment packet to cause the first end-point 120 to close down the transport connection, after the finding. For example, in some embodiments, the generating module 630 may cooperate with the sending module 640, or be integrated as a part of said sending module.

Moreover, according to the first embodiments, the gateway node 110 and/or the processing module 601 and/or the sending module 640 may be configured for sending, on the transport connection, the acknowledgement packet towards the first end-point 120, after the finding.

According to the second embodiments, the gateway node 110 and/or the processing module 601 and/or the generating module 630, or a further generating module (not shown), may be configured for generating a closing packet to cause the second end-point 130 to close down the transport connection, after the finding. The closing packet may comprise a reset packet, "RST", or a finish packet, "FIN".

Furthermore, the gateway node 110 and/or the processing module 601 and/or the sending module 640, or a further sending module (not shown), may be configured for sending, on the transport connection, the closing packet towards the second end-point 130, after the finding.

The transport connection 105 may be a transport layer connection, a Transmission Control Protocol connection, a Stream Control Transmission Protocol connection or the like.

The transport network 100 may be based on TCP, SCTP or the like.

A transport network 100 may comprise the gateway node 110, the first end-point 120 and the second end-point 130.

The gateway node 110 may be a Packet Gateway of an Evolved Packet Core network 101, comprising the transport network 100.

TCP General Operation

TCP is a connection oriented, bidirectional, transport protocol. It offers loss recovery, in-order delivery, flow control and congestion control, among other features.

A TCP connection has three distinct phases: an establishment phase where they 3-way handshake is exchanged to setup the connection, a data transmission phase and a connection teardown phase.

Any of the end-points of the connection can start a teardown process, or a closing procedure, and in fact both end-points should teardown the connection since the teardown procedure is directional—when each end-point tears down the connection it signals it's purpose of not sending any more data, although it could still receive and process more incoming data.

Half-Closed Connections

As an example, an end-point closes the connection only to the possibility of sending data, but the end-point is still willing to receive data. These are called half-closed connections. While this is correct according to the standard, this is an uncommon way of closing connections. Therefore, generally, when an end-point starts the teardown procedure by sending a FIN segment, i.e. a segment with a FIN flag set in the header, it will neither send new data nor process any new data, e.g. data packets, received after the FIN has been sent. Generally, the FIN segment may include or may not include user data, payload or the like.

Half-closed connections are a way of operating a TCP connection (and the associated socket) for applications that only receive data and do not transmit data.

Half-closed connections are a mechanism only available in TCP and it is mentioned here as TCP is used as an exemplifying embodiment. Since half-closed connections are not supported in all transport protocols, i.e. SCTP, this section only applies to TCP.

Half-closed connections were originally designed for operation of pipes over TCP/IP networks in UNIX systems. Pipes only read from standard or error input and do not write on the receiving end of the pipe. Pipes over TCP usually close their end of the TCP connection immediately after the 3-way setup.

While it is possible for an end-point to implement half-closed connections at the end of the connection, this is uncommon.

In any case, since the use of half-closed connections is application dependent (applications need to be programmed to implement half-closed connections) if the concepts expressed with the embodiments herein need not to apply to applications implementing half-closed connections, service classification could be used to filter those TCP connections out.

In that way, the DPI mechanisms used to follow the TCP connections are generally used to classify traffic based on service or application. A whitelist of applications not using half-closed connections could be compiled and the optimizations explained on this disclosure should apply to the applications or services in this list only. Equally a black list could be compiled and the optimizations on this disclosure applied to all applications and services except those in the black list. Either a white list or a black list may help in filtering out applications or services implementing half-closed connections.

As used herein, the term "node", or "gateway node", may refer to one or more physical entities, such as devices, apparatuses, computers, servers or the like. In particular, the term "gateway node" refer simply to a network node that is located in the transport connection path that conveys data packets between at least two end-points (e.g. a first and a second end-point), and that has the capability of receiving and transmitting data packets from/to these end-points. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to/for, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a hard drive, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a gateway node, for managing packets on a transport connection between a first end-point and a second end-point, wherein the gateway node is located on the transport connection, the method comprising:
    forwarding, on the transport connection, a first packet from the first end-point to the second end-point;
    finding, by inspection of the first packet, that the first packet indicates closing of the transport connection at the first end-point;
    generating, after the finding, an acknowledgment packet to cause the first end-point to close down the transport connection;
    sending the acknowledgement packet towards the first end-point on the transport connection;
    receiving, on the transport connection, a second packet from the second end-point, wherein the second packet is destined for the first end-point; and
    discarding the second packet, thereby refraining from forwarding the second packet from the second end-point to the first end-point on the transport connection.

2. The method of claim 1, further comprising, after the finding:
    generating a closing packet to cause the second end-point to close down the transport connection; and
    sending the closing packet towards the second end-point on the transport connection.

3. The method of claim 2, wherein the closing packet comprises a reset packet or a finish packet.

4. The method of claim 1, wherein the transport connection is a transport layer connection, a Transmission Control Protocol connection, or a Stream Control Transmission Protocol connection.

5. The method of claim 1, wherein a transport network comprises the gateway node, the first end-point, and the second end-point.

6. The method of claim 5, wherein the transport network is based on Transmission Control Protocol (TCP) or Stream Control Transmission Protocol (SCTP).

7. The method of claim 5, wherein the gateway node is a Packet Gateway of an Evolved Packet Core network, comprising the transport network.

8. A non-transitory computer readable recording medium storing a computer program product for controlling a gateway node for managing packets on a transport connection between a first end-point and a second end-point, wherein the gateway node is located on the transport connection, the computer program product comprising software instructions which, when run on processing circuitry of the gateway node, cause the gateway node to:
    forward, on the transport connection, a first packet from the first end-point to the second end-point;
    find, by inspection of the first packet, that the first packet indicates closing of the transport connection at the first end-point;
    generate, after the finding, an acknowledgment packet to cause the first end-point to close down the transport connection;
    send the acknowledgement packet towards the first end-point on the transport connection;
    receive, on the transport connection, a second packet from the second end-point, wherein the second packet is destined for the first end-point; and
    discard the second packet, thereby refraining from forwarding the second packet from the second end-point to the first end-point on the transport connection.

9. A gateway node for managing packets on a transport connection between a first end-point and a second end-point, wherein the gateway node is located on the transport connection, the gateway node comprising:
    processing circuitry; and
    memory containing instructions executable by the processing circuitry whereby the gateway node is operative to:
        forward, on the transport connection, a first packet from the first end-point to the second end-point;
        find, by inspection of the first packet, that the first packet indicates closing of the transport connection at the first end-point;
        generate, after the finding, an acknowledgment packet to cause the first end-point to close down the transport connection;

send the acknowledgement packet towards the first end-point on the transport connection;

receive, on the transport connection, a second packet from the second end-point, wherein the second packet is destined for the first end-point; and discard the second packet, thereby refraining from forwarding the second packet from the second end-point to the first end-point on the transport connection.

10. The gateway node of claim 9, wherein the instructions are such that the gateway node is operative to, after the finding:

generate a closing packet to cause the second end-point to close down the transport connection; and send the closing packet towards the second end-point on the transport connection.

11. The gateway node of claim 10, wherein the closing packet comprises a reset packet or a finish packet.

12. The gateway node of claim 9, wherein the transport connection is a transport layer connection, a Transmission Control Protocol connection, or a Stream Control Transmission Protocol connection.

13. The gateway node of claim 9, wherein a transport network comprises the gateway node, the first end-point, and the second end-point.

14. The gateway node of claim 13, wherein the transport network is based on Transmission Control Protocol (TCP) or Stream Control Transmission Protocol (SCTP).

15. The gateway node of claim 13, wherein the gateway node is a Packet Gateway of an Evolved Packet Core network, comprising the transport network.

* * * * *